(No Model.) 2 Sheets—Sheet 1.
J. H. CROSKEY & J. LOCKE.
UNDERGROUND ELECTRICAL CONDUCTOR AND METHOD OF MANUFACTURING SAME.
No. 540,540. Patented June 4, 1895.
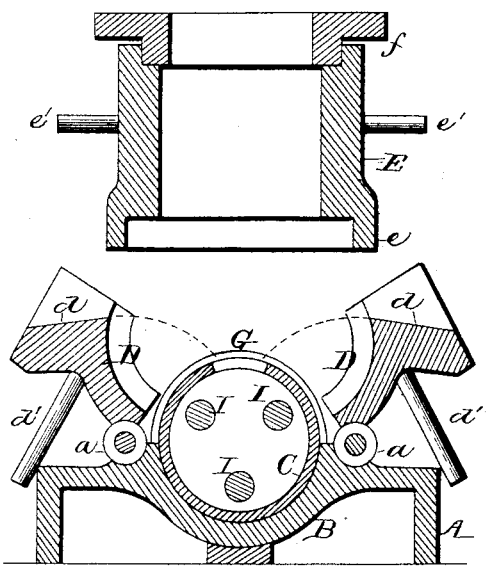
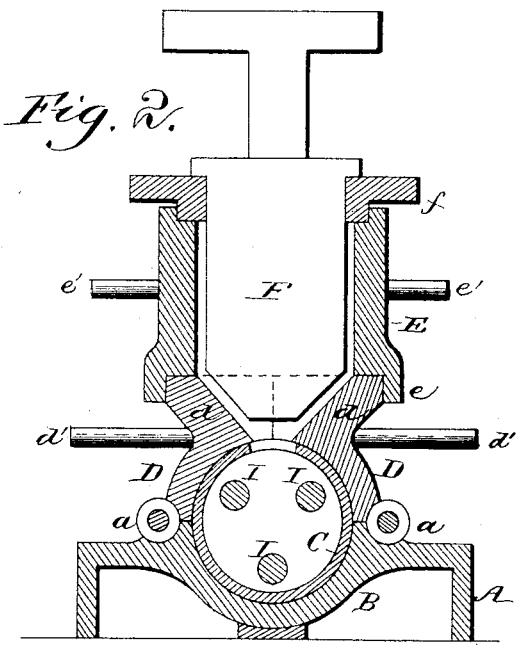
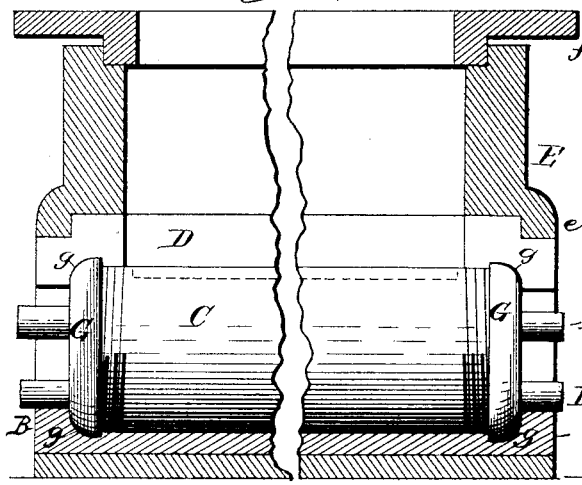
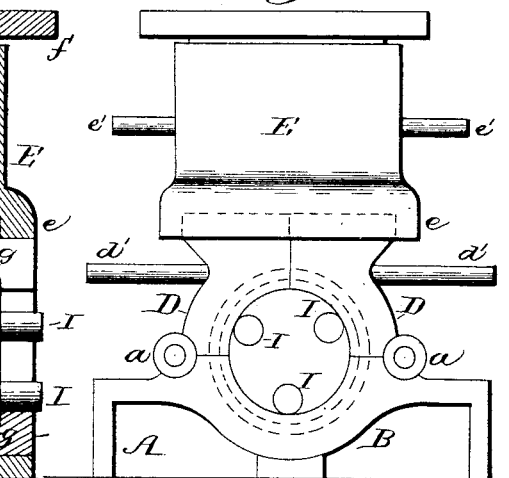
Witnesses:
Inventors
John H. Croskey
and Joseph Locke
by Connolly Bros,
Atty's (No Model.) 2 Sheets—Sheet 2.
J. H. CROSKEY & J. LOCKE.
UNDERGROUND ELECTRICAL CONDUCTOR AND METHOD OF
MANUFACTURING SAME.
No. 540,540. Patented June 4, 1895.
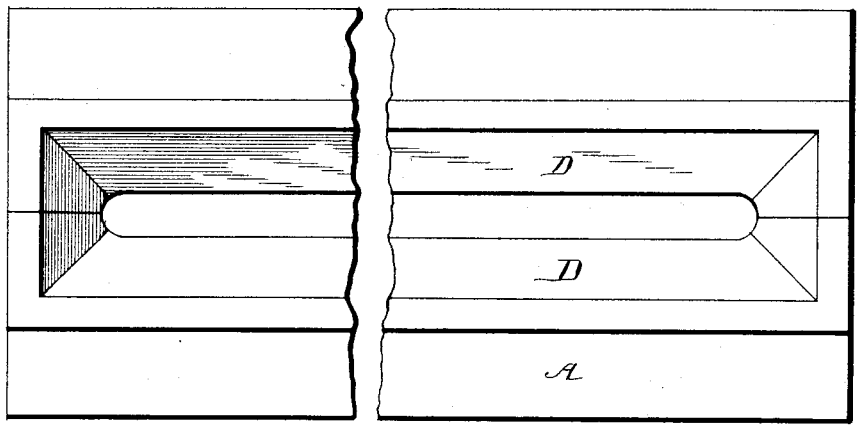
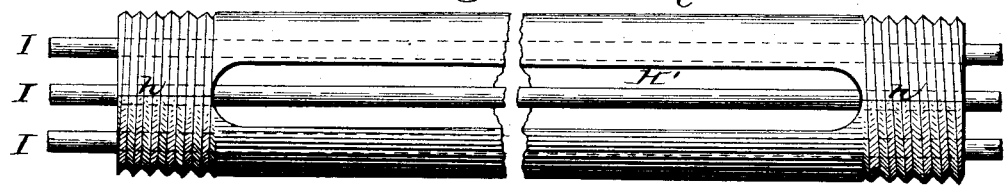
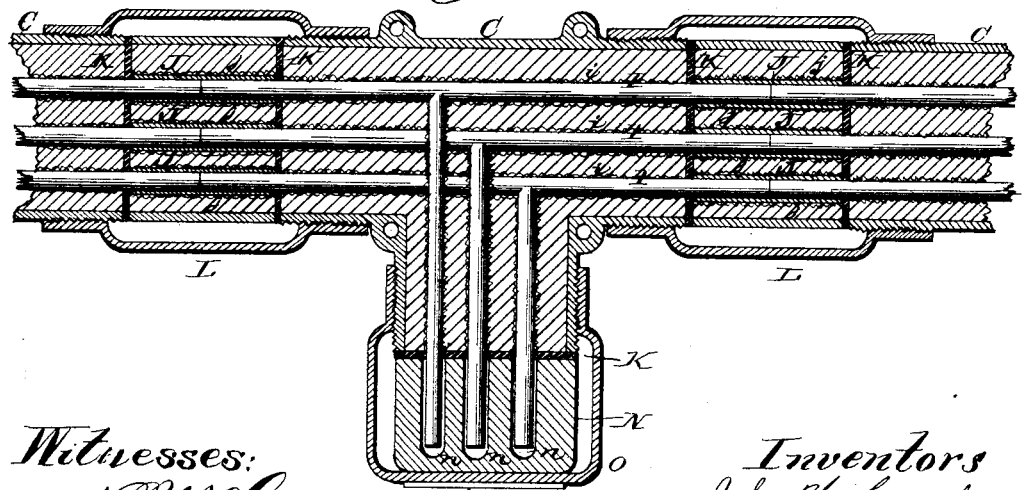
Witnesses:
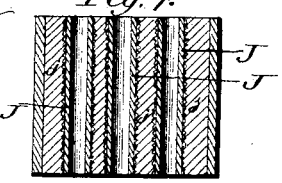
Inventors
John H. Croskey
and Joseph Locke
by Connolly Bros.
Atty's

UNITED STATES PATENT OFFICE.

JOHN H. CROSKEY AND JOSEPH LOCKE, OF PITTSBURG, PENNSYLVANIA.

UNDERGROUND ELECTRICAL CONDUCTOR AND METHOD OF MANUFACTURING SAME.

SPECIFICATION forming part of Letters Patent No. 540,540, dated June 4, 1895.

Application filed January 17, 1895. Serial No. 535,259. (No model.)

*To all whom it may concern:*

Be it known that we, JOHN H. CROSKEY and JOSEPH LOCKE, citizens of the United States, residing at Pittsburg, in the county of Allegheny and State of Pennsylvania, have invented certain new and useful Improvements in Underground Electrical Conductors and Methods of Manufacturing the Same; and we do hereby declare the following to be a full, clear, and exact description of the invention, such as will enable others skilled in the art to which it appertains to make and use the same.

Our invention has relation to underground electrical conductors and to methods of manufacturing the same, and has for its object the provision of a conductor inclosed in a solid mass of glass which is, in turn, inclosed in a metallic envelope, cover, or casing, and our invention has for its further object the provision of a novel method of inclosing the conductor, or conductors, in the glass and of inclosing the glass in the metallic envelope, cover, or casing.

Our invention has for its further object the provision of novel means for joining together the ends of the wires or cables, and for joining together the several sections of the metal envelope cover or casing, so as to produce an air and water tight insulated electrical conductor, of any desired length and practically continuous from end to end.

Our invention consists in the novel constructions, combinations, and arrangements of parts and in the novel method of manufacture hereinafter described.

Referring to the accompanying drawings, Figure 1 is a vertical transverse sectional view of a glass mold and pressing apparatus adapted to carrying out our method, showing the mold opened; Fig. 2, a similar view showing the mold closed; Fig. 3, an end view, and Fig. 4 a vertical longitudinal sectional view, of the same; Fig. 5, a plan view of the mold, the font and pressing devices being removed; Fig. 5, a plan view of a completed section of the insulated conductors; Fig. 7, a vertical longitudinal section of a joint section for connecting adjacent sections of the insulated conductors; and Fig. 8, a horizontal sectional view of a portion of an underground main containing several conductors, showing the manner of joining the adjacent sections, of closing dead ends, and providing for lateral branches.

The apparatus shown in Figs. 1, 2, 3, 4, and 5, comprises a mold adapted to receive a section of iron pipe in which the conductors to be insulated are temporarily sustained by removable caps, a font fitting on top of the mold, and a plunger adapted to press the glass from the font into the pipe, and around the conductors sustained therein.

A designates the base of the mold, having a semi-circular recess B, adapted to receive a section C of pipe, and provided with hinge members $a, a$, to which are hinged similar members on the upper hinged sections D, D, of the mold. These upper sections are in shape segments of circles and are formed with tangentially projecting wings $d, d$, which form a mouth for the mold when the sections are closed, and a seat for the font, E. This font E, is quadrangular in plan view and rests upon top of the sections D D and is formed with a depending flange $e$, that embraces the edges of the sections D D, and holds them together when closed. A plunger F, passes through a plate, or cap $f$, that rests on top of the font, and which may be a spring plate such as is ordinarily used in press molds.

The base A, of the mold, and the sections D D are cut out near each end so as to form grooves $g, g$, which receive caps G G that are fitted on the screw threaded ends of the pipe section C, and have holes through which pass the conductors I, I, I.

The pipe section C, is formed with a slot H' extending to near the ends of the sections, and from the ends of the slot to the ends of the pipe a kerf $h$, is cut to allow for expansion and contraction.

The sections D D are provided with handles $d' d'$ and the font E, with handles $e' e'$ by means of which these parts are manipulated.

In operating the above described apparatus, the caps G, G, are placed on the pipe section C, and the conductors I, I, I placed in position, passing through the holes in the caps. The pipe section is then laid in the base A of the mold, the sections D, D, are closed over it and the font E, placed in position on top of the mold, the depending flange e, serving to keep the sections tightly closed. A mass of molten glass is then placed in the font and is pressed therefrom down into the pipe section C, completely filling the same, and embedding the conductors I, I, I, in a solid mass of glass. The conductors I, I, I, before being embedded in the glass are preferably surrounded or coated with a non-combustible material, such as asbestos, which is shown at $i, i, i$.

The joint sections shown in Fig. 7 are made in the same manner as the pipe sections, but instead of the wires, or cables I, I, I, the joint sections have embedded in them sections of tubing J, J, J, which are of such size that they will fit over the projecting ends of the conductors, and form good electrical contacts. The sections of tubing are, preferably, covered or coated with a non-combustible material such as asbestos, before being embedded in the glass, this material being shown at $j, j, j$.

The sections being completed in the manner described are laid in a trench, or conduit, the ends of the wires I, I, I, in the pipe sections, being forced into the tubing J, J, J, in the joint sections, a filling K, K, such as a rubber washer, or a layer of suitable cement being inserted between the pipe sections and joint sections. Screw threaded union members L, L, are screwed onto the pipe sections, and completely cover and inclose the points of juncture between the pipe sections and joint sections. Where there is a "dead end," that is where the pipe sections and their inclosed conductors terminate, the ends of the conductors are covered by a block of glass N, which is formed with holes $n, n, n$, as shown, and a cap O is screwed upon the end of the pipe section, securely closing the same, and retaining the glass N, in position.

The devices for closing a "dead end" are illustrated in Fig. 8 of the drawings in which said devices are shown as applied to a "dead end" on a lateral branch from the main, but it will be understood that they can be applied in the same manner to the terminal of the main.

The sections of the main which are formed with lateral branches, such as that shown at the center of Fig. 8, are produced by the same method as the other sections of the main, the molding and pressing apparatus being modified to conform to the shape of the section to be produced.

Having described our invention, we claim—

1. The method of insulating electric conductors consisting in forcing molten glass into a metallic casing, or cover, and around a conductor, or conductors, therein, solely in a lateral direction through substantially the entire length of the casing substantially as described.

2. The method of insulating electric conductors, consisting in forcing molten pressed glass into a pipe section in a lateral direction, and around a conductor in said section and covering the conductor at all points simultaneously substantially as described.

3. An electric conductor embedded in a solid mass of glass which is inclosed in a split metallic cover or casing, substantially as described.

4. An insulated electric conductor section comprising a wire or wires, a solid mass of pressed glass in which the same is embedded and a split metallic tube inclosing said glass substantially as described.

5. An insulated electric conductor section comprising a split metallic tube, a solid mass of pressed glass molded into said tube, and a wire or wires embeded in said glass, substantially as described.

6. An insulated electric conductor consisting of a series of split pipe sections each containing a solid mass of pressed glass with a wire or wires embedded therein, a series of joint sections consisting of a mass of pressed glass containing tubes adapted to receive the ends of said wires and union members uniting the adjacent pipe sections, substantially as described.

7. An insulated electric conductor section consisting of a wire or wires covered or coated with a non-combustible material, a solid mass of pressed glass in which said wires are embedded and a split metallic envelope, cover, or covering, substantially as described.

In testimony whereof we have affixed our signatures in presence of two witnesses.

JOHN H. CROSKEY.
JOSEPH LOCKE.

Witnesses:
C. E. SUCCOP,
D. DALLAS HUGHY.